March 4, 1969 — A. F. RAAB — 3,431,374
ADJUSTABLE SAFETY SWITCH
Filed Aug. 14, 1967
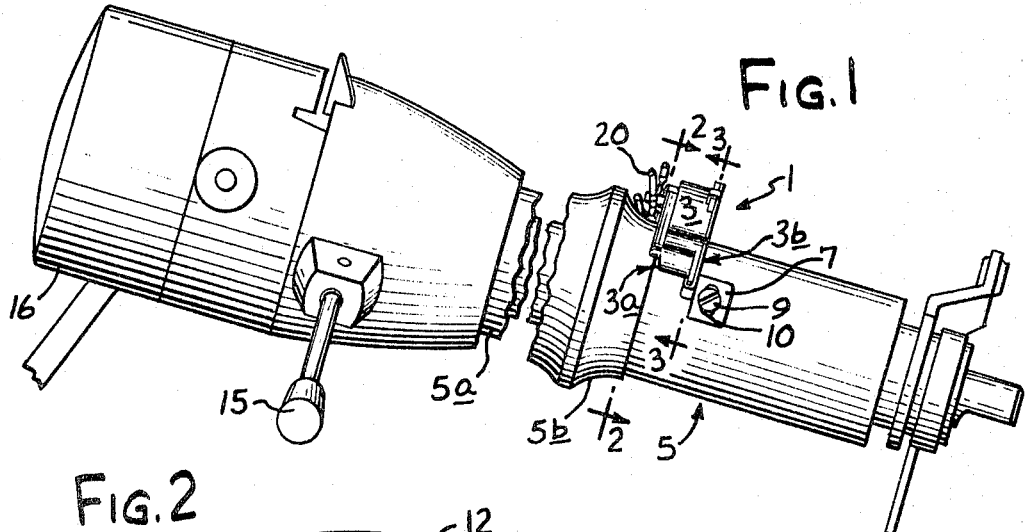
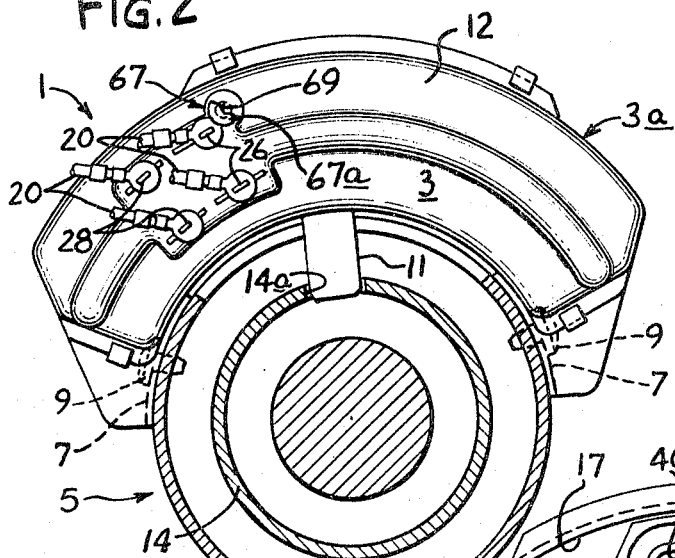
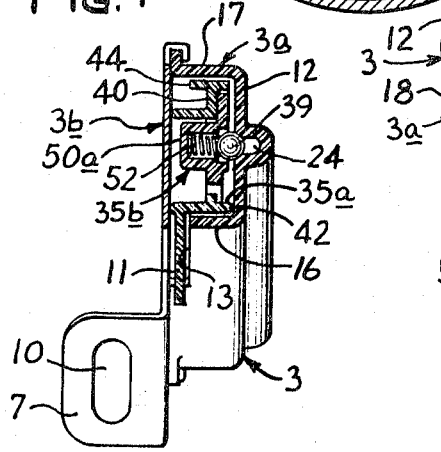
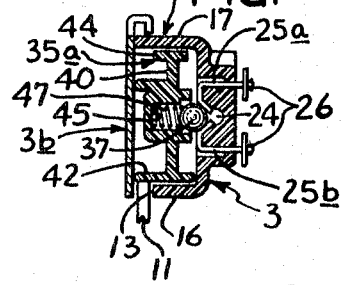
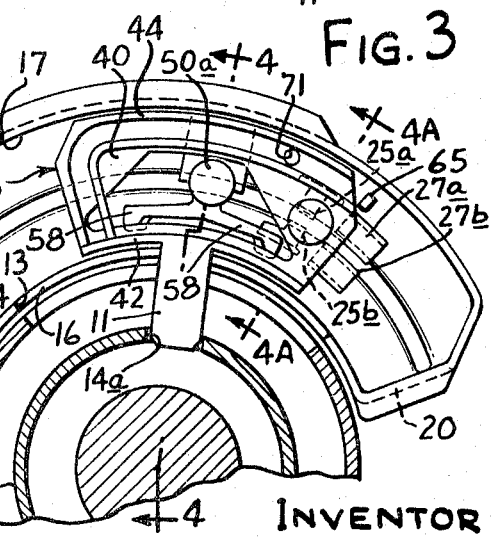
INVENTOR
ANDREW F. RAAB

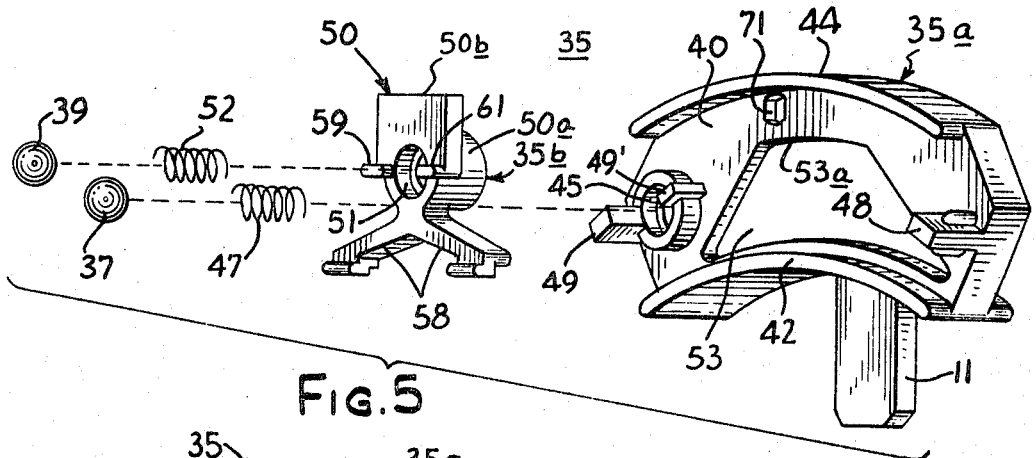
FIG.5
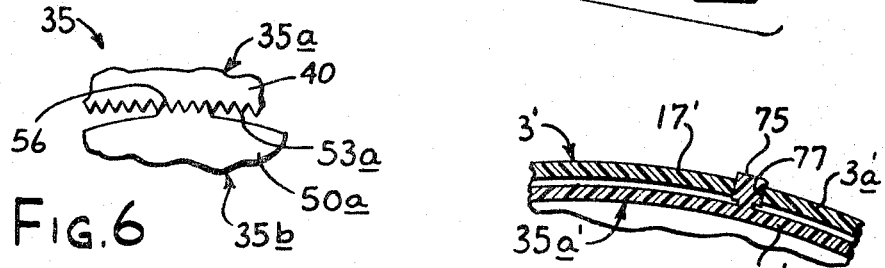
FIG.6
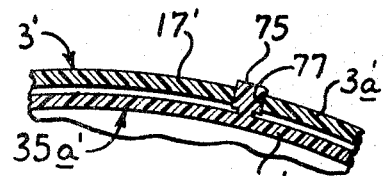
FIG.8
FIG.7
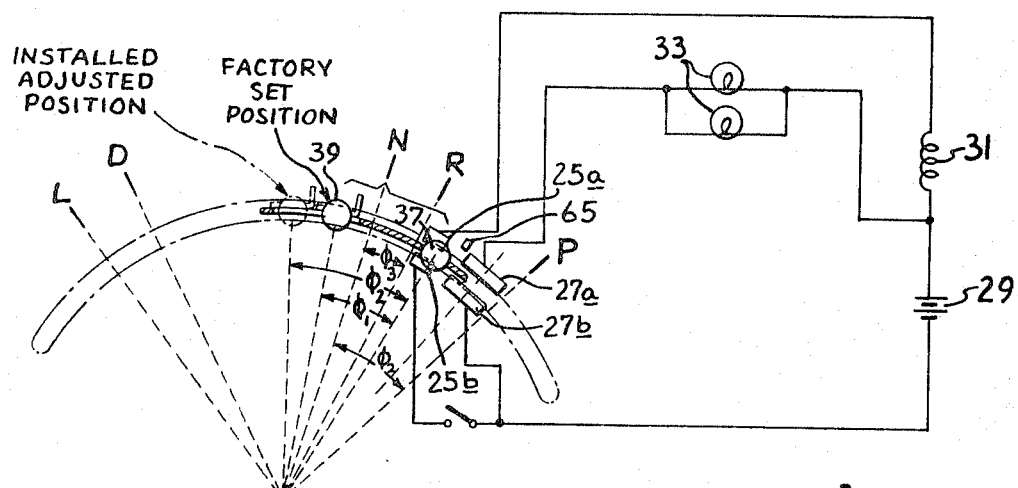

United States Patent Office 3,431,374
Patented Mar. 4, 1969

3,431,374
ADJUSTABLE SAFETY SWITCH
Andrew F. Raab, Morton Grove, Ill., assignor, by mesne assignments, to Littelfuse, Inc., a corporation of Texas
Filed Aug. 14, 1967, Ser. No. 660,427
U.S. Cl. 200—61.54                                    7 Claims
Int. Cl. H01h 9/00

ABSTRACT OF THE DISCLOSURE

The safety switch of the invention preferably comprises a housing with a track in the housing along which a carrier assembly is guided for movement within the housing. There is mounted in the housing a pair of stationary starter circuit contact segments located on opposite sides of the track. The carrier assembly carries a pair of contact segment bridging members, preferably freely rotatable balls, which bridge the contact segments in two different positions of the carrier assembly. The carrier assembly is made in two sections each carrying one of the contact segment bridging members. One of the carrier sections referred to has a main carrier section, is coupled for movement with the transmission shift lever of the automobile in which the switch is used. The other carrier section, to be referred to as the follower carrier section, is mounted for movement upon and relative to the main carrier section and is interconnected thereto by an adjustable coupling preferably comprising interengaging flexible resilient teeth, so that the follower carrier section can be held against movement as the main carrier section continues to move, thereby adjusting the relative spacing between the contact bridging members carried thereby.

---

This invention relates to a safety switch for an automobile which switch inhibits the starting of the automobile when the transmission thereof is in its "drive" or "reverse" position and which enables the starting of the vehicle when the transmission is in its "neutral" or "park" position. Such a safety switch has been made in a wide variety of forms. It generally includes a pair of spaced contact segments mounted on a switch housing which contact segments are adapted to be bridged by a ball or other contact bridging member mounted on a carrier which follows the movement of the transmission shift control lever to its various positions. Generally, the carrier supports a pair of contact bridging members, one of which bridges the contact segments when the shift control lever is in its "neutral" position and the other of which bridges the contact segments when the shift control lever is in its "park" position. The contact bridging members of the carrier are spaced apart a fixed distance depending upon the degree of movement imparted to the shift control lever as it moves between its "neutral" and "park" positions. Since different models of a given make of automobile frequently have transmission systems where the degree of movement imparted to the shift control lever in moving the same between its "neutral" and "park" positions varies, it was customary to design a different safety switch for each transmission system involved.

The present invention provides a safety switch unit as described above which is readily adjustable so that the same switch unit can be used with transmission systems requiring different degrees of movement of the shift control lever between its "neutral" and "park" positions. In accordance with the most specific form of the invention, the switch unit has a carrier assembly for a pair of balls or other contact bridging members which carrier assembly is made in two sections each carrying one of the contact bridging members. One of the carrier sections to be referred to as the main carrier section, is coupled for movement with the switch control lever to its various positions. The other carrier section, to be referred to as the follower carrier section, is preferably mounted for movement upon and relative to the main carrier section and is interconnected thereto by an adjustable interconnection so that the follower carrier section can be held against movement while the main carrier section can continue to move, thereby to adjust the relative spacing between the balls or the other contact bridging members carried thereby.

When the switch unit is initially assembled at the factory, a removable pin is provided which locks the main carrier section into a position where the contact bridging member carried by the main carrier section bridges a pair of stationary contact segments to which the start circuit of the automobile involved is to be connected. The follower carrier section is adjusted in position upon the main carrier section so the ball or other contact bridging member carried by the follower carrier section is spaced from the contact bridging member carried by the main carrier section a distance no greater than the distance which the carrier assembly is moved when coupled for movement with a shift control lever having a minimum degree of movement between its "neutral" and "park" positions. The switch unit is provided with a stop shoulder against which the follower carrier section abuts when the contact bridging member thereof bridges the starter circuit contact segments. When the switch unit of the invention is mounted in an automobile where the shift control lever has a greater degree of movement between its "neutral" and "park" positions, the contact bridging members of the carrier assembly are automatically adjusted to the proper spacing to accommodate the greater throw of the shift control lever because the aforementioned stop shoulder will engage the follower carrier section when it is in a position where the contact bridging member thereof bridges the contact segments, where the continued movement of the main carrier section automatically adjusts the spacing between the contact bridging members of the main and the follower carrier sections to the required amount.

The above and other advantages and features of the invention will become apparent upon making reference to the specification to follow, the claims and the drawings wherein:

FIG. 1 is a fragmentary side elevational view, partly broken away, of a steering wheel housing together with the associated transmission shifting mechanism, with the safety switch unit of the invention mounted upon the bottom portion of the steering wheel housing;

FIG. 2 is an enlarged sectional view of FIG. 1, taken along section line 2—2 thereof;

FIG. 3 is an enlarged sectional view shown of FIG. 1, taken along section line 3—3 thereof;

FIG. 4 is a transverse sectional view through the switch unit in FIG. 3, taken along section line 4—4 thereof;

FIG. 4A is a transverse section through the switch unit in FIG. 3, taken along section line 4A—4A thereof;

FIG. 5 is an exploded perspective view of the different parts making up the carrier assembly portion of the switch unit of the invention;

FIG. 6 is an enlarged fragmentary sectional view showing the manner in which the two sections of the carrier assembly are adjustably interconnected;

FIG. 7 is a circuit diagram of the starter and back-up light circuits of an automobile which are opened and closed by the safety switch unit of the present invention; and FIG. 8 is a fragmentary sectional view showing a modified carrier assembly locking construction for locking the same in a "neutral" position.

Referring more particularly to the drawings, the safety switch unit of the invention is generally indicated by reference numeral 1 and, in its preferred form, has a housing 3 comprising a main arcuate compartment-forming housing section 3a and a correspondingly shaped cover plate 3b which covers over the open side of the main housing section 3a. The housing 3 is adapted to be mounted around the bottom portion of a steering wheel shaft housing 5 having collapsible portions 5a and 5b by means including mounting flanges 7—7 extending transversely from the housing cover plate 3b. Screws 9—9 pass through slots 10 in the flanges 7 and thread into threaded openings in the steering wheel housing. The switch unit 1 has a carrier operating arm 11 extending through a slot 13 in the housing 3 to fit into a slot 14a in a rotatable transmission adjusting sleeve 14 within the steering wheel shaft housing 5 so that the carrier operating arm follows the rotational movement of the sleeve. The sleeve 14 is adjusted to various angular positions which adjusts the transmission to "park," "reverse," "neutral" and "drive" positions by the usual shaft control lever 15 at the base of the steering wheel hub 16.

As best shown in FIGS. 3 and 4, the main housing section 3a which may be made of synthetic plastic material, has a main wall 12 on the margins of which transversely extend inner and outer arcuate walls 16 and 17 and end walls 18 and 20. The inner arcuate wall 16 has the aforesaid slot 13 which forms a clearance space for the movement of the carrier operating arm 11. A pair of starter circuit contact segments 25a and 25b are mounted within the main housing section on opposite sides of a ball track 24 formed by an arcuate indentation or channel in the main housing section 3a. A pair of back-up light circuit contact segments 27a and 27b are mounted within the main housing section 3a on opposite sides of the ball track 24 in the vicinity of the starter circuit contact segments 25a and 25b but at a point closer to the end of the ball track 24 involved. The contact segments 25a–25b and 27a–27b have terminal-forming extensions 26 and 28 which are exposed on the outside of the housing 3 for soldering leads 20. As will appear, the starter circuit contact segments 25a and 25b will be bridged by a ball when the transmission system involved is in its "neutral" and "park" positions and the back-up light contact segments 27a and 27b will be bridged by a ball when the transmission system is in its "reverse" position. The contact segments 25a–25b and 27a–27b are illustrated in FIG. 7, which shows a simplified circuit for the start and back-up circuits of an automobile. As there shown, when the starter circuit contacts 25a–25b are bridged, the battery 29 of the automobile is coupled to a starter relay 31 which, when energized, causes a starter motor to be energized. When the back-up contact segments 27a and 27b are bridged, the battery 29 will be coupled to back-up lights 33 to energize the same.

Slidably mounted within the housing 3 is a carrier assembly 35 which may be made of the same molded synthetic plastic material as the main housing section 3a. The carrier assembly 35 carries a pair of spaced balls 37–39 and comprises a main carrier section 35a carrying the ball 37 and a follower carrier section 35b carrying the ball 39. The carrier operating arm 11 forms an integral extension of the main carrier section 35a. The main carrier section 35a is slidably disposed within the main housing section 3a and the follower carrier section 35b is adjustably mounted upon the main carrier section 35a in a manner to be described. The balls 37 and 39 are respectively carried by the main and follower sections 35a and 35b in a manner such that the angular spacing between the balls 37 and 39 normally remains fixed, but is adjustable automatically to accommodate different spacings between the "neutral" and "park" positions of the shift control lever 15 with which the switch unit 1 is used.

The main carrier section 35a has a main apertured wall 40 which extends in a plane generally parallel to the main wall 12 of the housing section 3a. Inner and outer arcuate walls 42 and 44 extend transversely beyond both sides of the wall 40 and extend along part of the inner and outer arcuate walls 16 and 17 of the main housing section 3a. The main apertured wall 40 of the main carrier section 35a has on the side facing the housing wall 12 an open socket or well 45 which contains a coil spring 47 which urges the ball 37 against the ball track 24. Extending from the main carrier section 35a on opposite sides of the socket 45 are a pair of circumferentially spaced ball-retainer extensions 49–49' one of which is longer than the other to extend within the ball track 24 to guide the movement of the carrier assembly. The main carrier section has another extension 48 which extends into the ball track to guide the movement of the carrier assembly.

The follower carrier section 35b has a head portion 50 including a cylindrical part 50a which forms a socket 51 which contains a coil spring 52 which urges the ball 39 against the ball track 24. The main wall 40 of the main carrier section has an aperture 53 with a serrated or toothed arcuate edge 53a. The cylindrical part 50a of the follower carrier section 35b has on the outer side thereof a serrated portion 56 which engages with the serrated edge 53a normally to prevent relative angular movement between the carrier sections 35a and 35b. The material out of which the carrier sections 35a and 35b are made is resilient and flexible so that by holding the follower carrier section 35b stationary, the main carrier section 35a can be forced to move with respect thereto by the resulting deformation and slippage between the interlocking teeth of the serrations.

The head portion 50a of the follower carrier section 35b has a flat part 50b which is slidable along the side of the main carrier section wall 40 facing the main housing section 3a when the carrier sections are forced to move with respect to one another in the manner described. The flat part of the head portion 50 of the follower carrier section 35a extends along the outer arcuate wall 44 of the main carrier section 35a. The follower carrier section 35b has a pair of legs 58—58 which engage both the inner arcuate wall 42 and the main apertured wall 40 of the main carrier section 35a. A pair of circumferentially spaced ball-retainer extensions 59–61 project on opposite sides of the open end of the socket 51 to retain the associated ball 39.

As previously indicated, the follower carrier section 35b is adjusted in position at the factory such that the angular spacing between the ball 39 carried thereby and the ball 37 carried by the main carrier section 35a is no greater than the angular movement imparted to the carrier assembly when the minimum throw transmission adjusting sleeve 14 is moved between its "neutral" and "park" positions.

Projecting outwardly from the wall 40 of the main housing section 3a is a stop shoulder 65 which is engaged by the head portion 50 of the follower carrier section 35b when the ball 39 carried thereby is in position to bridge the starter circuit contact segments 25a–25b. As above indicated, the stop shoulder 65 holds the follower carrier sections 35b stationary while the main carrier section 35a continues to move with the transmission adjusting sleeve 14 when the switch unit is used with a transmission having a greater than minimum throw between the "neutral" and "park" positions thereof.

The carrier assembly 35 is locked at the factory at a given reference position when the ball 37 of the main carrier section 35a will bridge the starter circuit contact segments 25a–25b by means including a removable pin 67 (FIG. 2) which snugly passes through an opening 69 formed in the wall 12 of the main housing section 3a and opening 71 formed in the wall 40 of the main carrier section 35a. The pin has a colored head 17a readily visible on the outside of the housing which head can be grasped by the person adjusting the same and removed after the switch unit is mounted in place as described. The flange slots 10 are elongated to permit the housing 3 to be adjusted in position so the carrier operating arm fits into the transmission adjusting sleeve slot 14a when the shift control level 15 is in "neutral" position. The pin 67 is removed after the switch unit is mounted in place around the steering wheel housing 5 with the carrier operating arm connected to the transmission adjusting sleeve 14.

It should be apparent that, with the present invention, the balls 37 and 39 of the switch unit 1 will automatically respectively bridge the starter circuit contact segments 25a–25b when the shift control lever is moved into "neutral" and "park" positions, the "park" position being one of the endmost positions of the transmission adjusting sleeve 14 and the carrier assembly. (Also, in the "reverse" position, the ball 37 carried by the main carrier section 35a will bridge the back-up light contact segments 27a–27b.) It should be also appreciated that the invention provides a very simple and inexpensive safety switch unit which is self-adjustable to different transmission systems as referred to above.

It should be understood that numerous modifications may be made in the most preferred form of the invention described above without deviating from the broader aspects thereof.

For example, instead of using a pin 67 to lock the carrier assembly 35 in a "neutral" position, the pin 67 and the associated openings can be eliminated and a radially extending projection 75 (see FIG. 8) can be integrally molded on the outer arcuate wall 44' of the main carrier section 35a'. When the carrier assembly is inserted within the housing section 3a', the carrier assembly projection 75 slides into a slot 77 formed, for example, in the outer arcuate wall 17' of the main housing section 3a'. The projection 75 is connected to the outer arcuate wall 44' through a connection which can be readily broken when the carrier assembly is forcibly moved from the "neutral" position by the shift control lever 15.

I claim:

1. In an enabling switch unit for the start circuit of a vehicle which circuit is to be closed in response to the movement of the vehicle's transmission shift control means to its "neutral" and "park" positions, the amount of said movement of the shift control means with which the switch unit is useable varying between given minimum and maximum limits, the switch unit including a housing, means for mounting said housing in a fixed predetermined position, and a pair of spaced but contiguous contact segments in said housing to be bridged by a contact bridging member in the "neutral" and "park" positions of said shift control means, the improvement comprising: a carrier assembly mounted in said housing and having a pair of contact bridging members which are respectively to bridge said contact segments in said "neutral" and "park" positions of said shift control means, said carrier assembly including two carrier sections respectively carrying said contact bridging members, means for coupling one of said carrier sections to said shift control means so that said one carrier section will follow the movement of said shift control means, the contact bridging member of said one carrier section bridging said contact segments when said shift control means is in one of said positions and, as said one carrier section is moved with said shift control means to the other position, the contact bridging member of the other carrier section is moved toward said contact segments ultimately to bridge the same, stop means in the path of movement of said second carrier section to stop the same when the contact bridging member carried thereby bridges said contact segments, and means adjustably interconnecting said carrier sections so that they normally move together but permitting said one carrier section to continue to move while said other carrier section is hindered from movement by said stop means, whereby automatically to adjust the spacing between the carrier sections to accommodate shift control means having said varying degrees of movement between the "neutral" and "park" positions thereof.

2. The enabling switch unit of claim 1 wherein their is provided releasable anchoring means for initially anchoring said carrier assembly in place at a point where the contact bridging member of said one carrier section bridges said contact segments, and the spacing between said two carrier sections being initially adjusted to be no greater than the distance said one carrier section is moved by a vehicle shift control means having a minimum degree of movement between said "neutral" and "park" positions, so the contact bridging member of said other carrier section will automatically bridge said contact segments when said releasable anchoring means is released and the carrier assembly is advanced by said shift control means moving into said other position.

3. The switch unit of claim 1 wherein said adjustable means interconnecting said carrier sections are resilient, flexible interlocking teeth on the carrier sections which slip relative to each other when said other carrier section is held against movement by said stop means while said one carrier section is moved with respect thereto.

4. The switch unit of claim 1 wherein said housing is provided with a slideway along which said one carrier section is guided for movement, and said one carrier section has a slideway within which said second carrier section is slidably supported, to effect the adjustable displacement between said carrier sections.

5. The enabling switch unit of claim 1 wherein said contact segments are positioned on opposite sides of a ball track formed in said housing, said contact bridging member being balls respectively carried by said carrier sections which balls ride along said ball track as the carrier assembly is moved within said housing.

6. The switch unit of claim 2 wherein said releasable anchoring means is a pin which extends through aligned openings in said housing and said one carrier section and which is removable from outside of the housing.

7. The switch unit of claim 2 wherein said releasable anchoring means is an integral extension of one of said housing and said one carrier section of the carrier assembly and an opening in the other of same for receiving the extension, said extension being readily severable by a transmission shifting force applied to said carrier assembly.

References Cited

UNITED STATES PATENTS

| 2,360,496 | 10/1944 | Hill | 200—61.54 |
| 2,792,463 | 5/1957 | Lincoln et al. | 200—61.54 |
| 2,894,089 | 7/1959 | Newcomb | 200—61.54 |
| 2,966,560 | 12/1960 | Gluck | 200—16 |
| 3,178,523 | 4/1965 | Farrell | 200—16 |

ROBERT K. SCHAEFER, *Primary Examiner.*

R. A. VANDERHYE, *Assistant Examiner.*

U.S. Cl. X.R.

200—16, 166, 61.88